United States Patent [19]
Ciaperoni et al.

[11] Patent Number: 4,574,054
[45] Date of Patent: Mar. 4, 1986

[54] MOLECULAR WEIGHT CONTROLLERS COMBINATION FOR CAPROLACTAM POLYMERIZATION PROCESSES

[75] Inventors: Aldemaro Ciaperoni, Bollate; Alberto Cappelli, Cogliate, both of Italy

[73] Assignee: Snia Fibre S.p.A., Via Friuli, Italy

[21] Appl. No.: 566,384

[22] Filed: Dec. 28, 1983

[30] Foreign Application Priority Data

Dec. 31, 1982 [IT] Italy .................................. 25075 A/82

[51] Int. Cl.$^4$ .......................... C09K 3/00; C08G 69/16
[52] U.S. Cl. .................................. 252/188.31; 528/315; 528/319
[58] Field of Search .................. 252/188.31; 528/315, 528/319

[56] References Cited

U.S. PATENT DOCUMENTS 3,893,981  7/1975  Thoma et al. ........................ 528/315

Primary Examiner—Harold D. Anderson
Attorney, Agent, or Firm—Wenderoth, Lind & Ponack

[57] ABSTRACT

The invention is concerned with a combination of molecular weight controllers to be used in the production of a stabilized polyamide having a low content of monomers and oligomers and a high dye-taking capability by polymerization of caprolactam. The combination comprises: (a) a primary monofunctional amine having its boiling point at 180° C. above, and a basic dissociation constant $K_b \geq 1.7 \times 10^{-5}$; (b) a monofunctional organic acid having a $K_a > 1.5 \times 10^{-5}$; and (c) an aminoacid containing at least ten carbon atoms having the —NH$_2$ group salified by a monofunctional organic or inorganic acid which has $K_a > 1.0 \times 10^{-2}$. With this combination, a polyamide is obtained which, following residence in the molten state, has a monomer content of 0.25% or less and a dimer content of 0.15% or less.

8 Claims, No Drawings

MOLECULAR WEIGHT CONTROLLERS COMBINATION FOR CAPROLACTAM POLYMERIZATION PROCESSES

BACKGROUND OF THE INVENTION

1. Field of the Invention

This invention relates to a novel catalytic combination of reactants, in particular molecular weight controllers, suitable for use with caprolactam (continuous or discontinuous) polymerization processes.

2. Prior Art

The polymer yielded by the polymerization of caprolactam (Nylon 6) in the presence of suitable additives contains about 10% of a hydroextractable material composed of caprolactam monomers and cyclic oligomers containing 2 to 7 monomeric units. Such materials must be removed from caprolactam because they considerably deteriorate the polymer characteristics, making it unusuable as a prime material for conversion into a yarn or as a man-made polymer for molding. Such materials tend to form a deposit on the extrusion dies and to surface from the extruded articles in the course of subsequent processing steps, depositing, for instance, on the spinning line rollers or creating problems of various natures during the molding step.

In particular caprolactam monomers, where the polymer is converted into a yarn or polymer porcessing temperatures in the 250°–265° C. range, would evaporate from the molten polymeric material and solidify over the cool areas of the system, thus producing degradation products which may discontinue the spinning process. Cyclic oligomers may readily migrate to the surface of the yarn thus produced and create a malfunction of both the rotary drive and winding members, and of the baths for subsequent dyeing, which would be highly contaminated by such products.

The extractable material, 80 to 85% of which is composed of caprolactam, is conventionally removed either by scrubbing the formed polymer with water, which process is power-consuming, or by effecting a so-called demonomerization during the polymerization itself by vacuum application. It is, however, necessary that, during the polymerization process, the polymer be so structured as to have a diminshed tendency to form caprolactam monomer and cyclic oligomers, and that the formation rate of caprolactam monomer and cyclic oligomers from the molted polymer be lower than the rate of removal of such extractable materials.

It is known that the propensity or non-propensity of the polymer to form caprolactam monomers in particular, and the reaction kinetics in general, are a function of the concentration of the terminal groups and the degree of polymerization, and that this is in turn dependent, among others, on temperature.

Past investigation work carried out by the Applicant has shown that in order to limit the formation of caprolactam, especially while spinning, the content of terminal amino-groups should be as small as possible. It has been found, for example, that in the instance of a polymer containing about 60–65 equiv/$10^6$ g of terminal carboxylic groups, the tendency of the polymer to reform caprolactam monomers, with the polymer maintained in the molten state, has an increasing pattern up to about 40 equiv/$10^6$ g of terminal amino-groups. Besides that concentration, the amount of reformed monomer, which is indicative of the monomer reformation rate from the molten polyamide, is maintained at a substantially constant high value.

Accordingly, in order to make the formation rate of extractable material as low as possible, which is an all-important condition for a process not providing for a water scrubbing step, it becomes necessary to synthesize a polyamide having the lowest possible content of terminal amino-groups.

On the other hand, however, the need for significant polymerization kinetics requires the provision of some terminal groups (both amino and carboxylic) because these groups enable molecular weight to be increased. Further, where the polycaprolactam is converted into a yarn, then the terminal amino-groups become necessary to impart the fiber with a good dye-taking capability.

The carboxylic groups are required to trigger the polymerization reaction, however, they also tend, albeit to a lesser degree, to promote the monomer formation where the polymer is born in the molten state.

Thus, the need arises therefrom for synthesizing a polyamide which can meet at one time the following requirements:

(a) significant polymerization kinetics, compatibly with an industrial process, and hence, with determined values of terminal, amino, and carboxylic groups;

(b) good dye-taking ability of an article obtained from the fiber resulting from that polyamide, as determined, inter alia, by the presence of amino-groups; and (c) the rate of formation of extractable material (both monomer and cyclic dimer), with the polymer maintained in the molten state, to be the lowest possible, whereby the amount of amino groups should be as small as possible.

Since the amino and carboxylic groups of polyamide 6 vary according to the amounts and types of substances with an acidic or basic character (molecular weight controller) respectively introduced from the outset of the polymerization, by changing the relative compositions of the molecular weight controllers, one can change the content of the terminal groups.

Known in the art are many molecular weight controllers, both having an acidic nature and a basic nature, used both singly or combined together.

Known in particular is the use of mono- and diamines having at least 6 carbon atoms and of mono- and dicarboxylic acids (U.S. Pat. No. 3,578,640), which are added individually to the reaction mass as chain terminators or molecular weight controllers in the continuous production of caprolactam having a relatively low extractable material content. Also known is to use primary or secondary amines (UK Pat. No. 1,532,603), and cyclohexylamine acetate (U.S. Pat. No. 3,477,094).

However, the molecular weight controllers used in prior polymerization processes fail to achieve at one time all of the three objectives mentioned above.

It has been now unexpectedly found that it is possible to achieve simultaneously such objects, i.e. it is possible to obtain a polyamide having significant polymerization kinetics, a high dye-taking ability, and a low content of monomer and cyclic oligomers in the molten state polymer, if a particular combination of molecular weight controllers is used, which combination affords control capabilities in a desired manner over the final product of a caprolactam polymerization process, in terms of the overall terminal amino-group content.

SUMMARY OF THE INVENTION

Accordingly, it is a primary object of this invention to provide a combination of molecular weight controllers which is especially useful with caprolactam polymerization processes, and which can yield a stabilized polyamide having an overall extractable material content not exceeding 0.7% by weight, and good dye-taking characteristics.

A further object of the invention is to provide a stabilized polyamide having a molecular weight in the 13,000 to 20,000 range, preferably in the 16,000 to 18,000 range, an extractable material content not exceeding 0.7% by weight, and in particular a caprolactam monomer content not exceeding 0.25%, and a cyclic dimer content not exceeding 0.15% and having a concentration of terminal amino-groups within 22 to 42 equiv/$10^6$ g with respect to the polymer total weight, the polyamide being obtained by means of a caprolactam polymerization process which utilizes the combination of molecular weight controllers according to this invention.

These and other objects, such as will be more readily apparent hereinafter, are achieved by a combination of molecular weight controllers useful with caprolactam polymerization processes and characterized in that it comprises the three following components:

(a) a monofunctional primary amine having a boiling point equal to or higher than 180° C. at atmospheric pressure, and a basic dissociation constant equal to or higher than $1.7 \times 10^{-5}$;

(b) a monofunctional organic acid having an acid dissociation constant higher than $1.5 \times 10^{-5}$; and (c) an aminoacid containing at least 10 carbon atoms and having its amino groups salified by a monofunctional acid having an acid dissociation constant higher than $1.0 \times 10^{-2}$.

As the component (a), particularly preferred amines are nonylamine, decylamine, and benzylamine; as the component (b), acetic acid and some homologs such as propionic, butyric, amylic, acid, etc. are preferably used.

The component (c) is an aminoacid, preferably aminododecanoic acid, having its amino groups salified by an acid which may be either organic or inorganic and should have an acid dissociation constant higher than $1.0 \times 10^{-2}$.

Suitable salifying acids are, for example, p-toluenesulphonic acid, naphtalenesulphonic acid, hydrochloric acid, and metaphosphoric acid.

The overall amount of the three components, in the combination of molecular weight controllers added in the polymerization medium, should not exceed 85 equiv/$10^6$ g with respect to the polymer weight total, because larger amounts would lower the molecular weight of the finished polymer and damage the yarn mechanical properties, nor should it be less than 50 equiv/$10^6$ g with respect to the total polymer amount.

More specifically, the amount (as expressed in equiv/$10^6$ g) of basic groups introduced with the molecular weight control system—i.e. component (a) plus component (c)—will preferably range from about 20 to 46 equiv/$10^6$ g, and the amount of component (b) will be in the 23 to 50 equiv/$10^6$ g range.

Within the indicated range for the total of two components (a)+(c), the specific component ratios will vary according to the desired final characteristics for the polymer. In practice, the third component (c) will be added in an amount corresponding to about ⅛ to about ½ the amount of component (a).

With the combination of molecular weight controllers according to this invention, including the three components specified above in the indicated amounts, and used as described hereinafter with a caprolactam polymerization process, a polyamide is obtained which has the following characteristics:

a terminal amino-group content in the 22 to 42 equiv/$10^6$ g range, preferably from 26 to 35 equiv/$10^6$ g;

a terminal carboxylic group content in the 5 to 20 equiv/$10^6$ g range, preferably from 10 to 15 equiv/$10^6$ g a numeric molecular weight in the 13,000 to 20,000 range;

a content of caprolactam monomer content of 0.25% by weight in the molten polymer;

a dimer content in the molten polymer of 0.15% by weight; and an overall content of extractables in the molten polymer of 0.7% by weight.

DETAILED DESCRIPTION OF THE PREFERRED EMBODIMENT

The components of the molecular weight controller combination of this invention may be added separately from one another, or jointly, in the polymerization medium which is comprised of water and caprolactame, or alternatively, may be admixed individually with the caprolactam.

The polymerization of caprolactam in the continuous process using the combination of molecular weight controllers according to this invention may be carried out under the following conditions.

The amount of water added initially to the monomer may be in the 0.5% to 2% by weight range.

The polymerization reaction is effected in two steps, both at a temperature within 230° C. to 260° C., preferably within 230° C. to 240° C. During the first step (of hydrolysis and polyaddition) the pressure is the autogenous pressure, whereas the second step (of polycondensation) is conducted under a very high vacuum, preferably at a residual pressure not exceeding 5 mm Hg.

Under such conditions, caprolactam, and in part also the lower cyclic oligomers (dimer and trimer) are evaporated. Further, the evaporated hydroextractable portion does not reform, or is reformed at a slower rate than the amount which is being removed during polycondensation.

Thus, the polyamide produced by this process is extractable material-poor and requires no scrubbing (or extracting) with water prior to its conversion into a yarn.

The catalytic combination of the three molecular weight controllers according to this invention may be employed, however, not only with the continuous process described hereinabove, wherein demonomerization is carried out concurrently with polymerization under high vacuum, but also with conventional polymerization processes wherein the polycondensation reaction (step II of polymerization) is conducted at a residual pressure in the 100 to 700 mm Hg range. In that case, the polymer should be extracted (scrubbed) with water prior to its conversion into a yarn because the content in extractable material of the formed polymer is higher than in the former process embodiment, but with the advantage of having a lower rate of reformation of monomer and oligomers in the molten state than a polyamide yielded by a conventional process utilizing prior MW controllers.

The duration time of the polymerization process may vary from 5 to 40 hours, depending on the overall amount of the components, of the molecular weight controllers, and on the process used to polymerize the caprolactam.

In the following examples intended to illustrate the invention without limiting its scope, the determination of the content of caprolactam and the individual cyclic oligomers (from dimer to heptamer) is effected by liquid chromatography (Hewlett Packard, Liquid-Chromatograph 1010B). To prepare the sample, the polymer, as ground and sieved down to 1 mm particle size, is extracted for 16 hours with water to boiling. The filtrate is dry evaporated, then vacuum dried at 60° C., and for the analysis, dissolved in a 40/60 mixture of trifluoroethanol/water.

The stability of the resulting polymer is checked by analyzing the content in monomers and oligomers of the polymer yielded at the end of the polymerization process and of the polymer melted at 260° C. under a slow nitrogen stream and maintained in these conditions for one hour, and then re-solidified.

The smaller the percent difference ($\Delta$) between the two contents thus obtained, i.e. between the amounts of monomer and dimer formed in the molten polymer, the stabler is the polymer analyzed.

In the Examples which follow, all parts and percentages are by weight, unless otherwise specified.

EXAMPLE 1 (conventional method except that the combination of this invention is used)

113 parts caprolactam, 1.05 parts water, 0.26 parts acetic acid, 0.556 parts benzylamine, and 0.34 parts aminododecanoic N-chlorohydrate acid are heated to 230° C. in a sealed vessel. Autogenous pressure is 1.5 atmospheres, and the conditions are maintained for 6 hours.

After bringing the vessel down to atmospheric pressure while raising the temperature to 250° C., the reaction mass is maintained for 30 minutes in a stream of pure nitrogen (oxygen content below 5 ppm). Thereafter, the vessel internal pressure is gradually lowered to 250 mm Hg residual pressure, and the conditions are maintained for 7 hours.

After cooling, the resulting polyamide is ground and sieved. The particles, of a smaller size than 1 mm diameter, are extracted with water to boiling for 16 hours.

After drying, the extracted (scrubbed) polyamide has the following properties:

| molecular weight | = 16,700 |
| --- | --- |
| content in amino-groups | = 31 equiv/$10^6$ g |
| content in monomer | = 0.13% |
| content in cyclic dimer | = 0.12% |
| content in other oligomers | = 0.23% |

A quota of extracted and dried polyamide is placed in a vessel heated to 260° C. under a slow nitrogen stream and maintained in that condition for one hour. After cooling, the polyamide is again analyzed by liquid chromatography as mentioned hereinabove, and the following values are obtained:

| content in monomer | = 0.19% |
| --- | --- |
| content in cyclic dimer | = 0.12% |
| content in other oligomers | = 0.18% |

Thus, the amounts ($\Delta$) of caprolactam and oligomers formed in the molten polymer are, respectively:

| $\Delta$ caprolactam | = 0.06% |
| --- | --- |
| $\Delta$ cyclic dimer | = — |
| $\Delta$ other oligomers | = — |

Such low values for $\Delta$ mean that the polyamide obtained with the process described in Example 1, owing to the use of the molecular weight controller combination of this invention, is perfectly stabilized against the formation of extractable material.

EXAMPLE 2 (reference example; conventional method)

The same procedure as in Example 1 is used, excepting that as the molecular weight controller acetic acid alone is used in the amount of 0.27 parts per 113 parts caprolactam and 1 part water, and that residual pressure within the vessel is 400 mm Hg.

The following results are obtained, in the extracted (scrubbed) polyamide:

| molecular weight | = 17,800 |
| --- | --- |
| content in amino-groups | = 28 equiv/$10^6$ g |
| content in monomer | = 0.15% |
| content in cyclic dimer | = 0.13% |
| content in other oligomers | = 0.25% | in the polyamide maintained in the molten state:

| content in monomer | = 1.75% |
| --- | --- |
| content in cyclic dimer | = 0.53% |
| content in other oligomers | = 0.16% | amount ($\Delta$) of extractable material formed:

| $\Delta$ caprolactam monomer | = 1.6% |
| --- | --- |
| $\Delta$ cyclic dimer | = 0.4% |
| $\Delta$ other oligomers | = — |

The polyamide obtained in this example is not stabilized and has a strong tendency to reform monomers and dimers as the polyamide is maintained in the molten state.

EXAMPLE 3 (continuous process under high vacuum, using the inventive combination)

113 parts caprolactam, 1.2 parts water, 0.61 parts benzylamine, 0.26 parts acetic acid, and 0.38 parts aminododecanoic N-p toluenesulphonate acid are introduced into a sealed vessel and the mixture is heated at 230° C. for 6 hours.

The vessel pressure is lowered from 15 atmospheres to atmospheric pressure, and then further lowered down to 1-2 mm Hg. The time required to reach high vacuum is 10 minutes, and such conditions are maintained for 4 hours.

For the unextracted but ground and sieved polymer, the chemical properties and oligomer compositions are determined.

A quota of the resulting polymer is subjected to melting conditions as described hereinabove, and the composition of the polymer containing compositions of the formed oligomers (Δ) and those contained in the polymer are again determined.

The results are shown in the Table.

EXAMPLE 4 (high vacuum process; example conforming with this invention)

Example 3 is repeated, except that the composition of the polymerization mixture is replaced with the following composition:
113 parts caprolactam
1.2 parts water
0.26 parts acetic acid
0.81 parts nonylamine
0.38 parts aminododecanoic N-p toluenesulphonate acid.

The results are shown in the Table.

EXAMPLE 5 (high vacuum process; reference example)

Example 3 is gone through again, except that the combination of molecular weight controllers according to this invention are replaced with the acetic acid along. The polymerization mixture has therefore the following composition:
113 parts caprolactam
1.05 parts water
0.58 parts acetic acid The results are shown in the Table.

EXAMPLE 6 (high vacuum process; reference example)

Example 4 is gone through again, except that the combination of molecular weight controllers according to the invention are replaced with a binary mixture of acetic acid-nonylamine, thus doing without the third component of this invention.

The polymerization mass has the following composition:
113 parts caprolactam
1.05 parts water
0.26 parts acetic acid
0.74 part nonylamine The results are shown in the Table.

TABLE

| Ex. | METHOD | MW CONTROLLERS | ANALYSIS OF THE FINISHED POLYMER | | | | |
|---|---|---|---|---|---|---|---|
| | | | MW | —$NH_2$ | CL % | Di % | R % |
| 1 | POLYMERIZATION + SCRUBBING | Acetic acid; Benzylamine; Aminododecanoic N—chlorohydrate acid. | 16700 | 31** | 0,13 | 0,12 | 0,23 |
| 2* | POLYMERIZATION + SCRUBBING | Acetic Acid | 18700 | 28 | 0,15 | 0,13 | 0,25 |
| 3 | UNDER HIGH VACUUM, NO SCRUBBING | Acetic acid; Benzylamine; Aminododecanoic N—p Toluenesulphonate ac | 18270 | 27** | 0,21 | 0,12 | 0,37 |
| 4 | UNDER HIGH VACUUM, NO SCRUBBING | Acetic acid; Nonylamine; Aminododecanoic N—p Toluenesulphonate ac. | 18460 | 26** | 0,19 | 0,13 | 0,38 |
| 5* | UNDER HIGH VACUUM, NO SCRUBBING | Acetic Acid | 24750 | 0,5 | 0,30 | 0,32 | 0,47 |
| 6* | UNDER HIGH VACUUM, NO SCRUBBING | Acetic Acid Nonylamine. | 16570 | 26 | 0,31 | 0,21 | 0,43 |

| Ex. | METHOD | MW CONTROLLERS | ANALYSIS OF THE POLYMER AS MELTED AND RE-SOLIDIFIED | | | Δ | | |
|---|---|---|---|---|---|---|---|---|
| | | | CL % | Di % | R % | CL % | Di % | R |
| 1 | POLYMERIZATION + SCRUBBING | Acetic acid; Benzylamine; Aminododecanoic N—chlorohydrate acid. | 0,19 | 0,12 | 0,18 | +0,06 | — | — |
| 2* | POLYMERIZATION + SCRUBBING | Acetic Acid | 1,75 | 0,53 | 0,16 | +1,60 | +0,40 | — |
| 3 | UNDER HIGH VACUUM. NO SCRUBBING | Acetic acid; Benzylamine; Aminododecanoic N—p Toluenesulphonate ac | 0,20 | 0,14 | 0,33 | — | +0,02 | — |
| 4 | UNDER HIGH VACUUM, NO SCRUBBING | Acetic acid; Nonylamine; Aminododecanoic N—p Toluenesulphonate ac. | 0,20 | 0,14 | 0,36 | +0,01 | +0,01 | — |
| 5* | UNDER HIGH VACUUM, NO SCRUBBING | Acetic Acid | 0,31 | 0,43 | 0,46 | — | +0,11 | +0,01 |
| 6* | UNDER HIGH VACUUM, NO SCRUBBING | Acetic Acid Nonylamine. | 0,37 | 0,28 | 0,45 | +0,06 | +0,07 | +0,02 |

*Reference Examples.
**The amounts of Amino-groups shown also include those salified, non-titratable.
CL % = Monomer Percentage; DI % = Cyclic Dimer Percentage; R % = Percentage of other olygomers present, from trimer to heptomer; —$NH_2$ = Amount of terminal amino-groups expressed as Equiv/$10^6$ g of the polymer weight total; MW = Molecular Weight.

It may be noted that it is only with the combination of the three molecular weight controllers of this invention that it becomes possible to obtain a stabilized polyamide against the formation of monomers and oligomers in the polymer yielded following residence in the molten state. In fact, the values for $\Delta$ in Examples 1, 3 and 4 according to the invention are considerably lower than in the reference Examples, e.g. Example 2, where CL reaches 1.6%; even though for the scrubbed polymer the contents in oligomers and monomers are low.

In reference Example 6, using components (a) and (b) but not component (c), the values for $\Delta$ show an improvement over reference Examples 2 and 5, wherein acetic acid alone is used, but the content of the monomers and oligomers of the resulting polyamide after residence in the molten state are high.

The amount of terminal amino-groups, including the salified ones, obtained in the Examples according to the invention is sufficiently large to impart the fiber thus obtained from the polyamide with a good dye-taking ability, and since a part of such amino-groups are salified, it is also adapted, as shown in the Examples, to provide stabilized polyamides or polyamides having a low monomer and cyclic oligomer content.

We claim:

1. A combination of polycaprolactam molecular weight controllers to be added to a polymerizable caprolactam composition comprising the following three components:
   (a) a monofunctional primary amine having a boiling point equal to or higher than 180° C. at atmospheric pressure, and a basic dissociation constant equal to or higher than $1.7 \times 10^{-5}$;
   (b) a monofunctional organic acid having an acid dissociation constant higher than $1.5 \times 10^{-5}$; and
   (c) a salified aminoacid containing at least 10 carbon atoms and having the amino groups salified by a monofunctional organic or inorganic acid having an acid dissociation constant higher than $1.0 \times 10^{-2}$.

2. A combination according to claim 1, wherein said component (a) is selected from the group consisting of nonylamine, decylamine, and benzylamine.

3. A combination according to claim 1, wherein said component (b) is acetic acid, propionic acid, butyric acid, or amylic acid.

4. A combination according to claim 1, wherein said component (c) is aminododecanoic acid having its amino-group salified.

5. A combination according to either claim 1 or claim 4, wherein said monofunctional acid adapted to salify the amino-group of said aminoacid is selected from the group consisting of p-toluenesulphonic acid, naphtalenesulphonic acid, hydrochloric acid, and metaphosphoric acid.

6. A combination according to claim 1, wherein it comprises benzylamine, acetic acid, and aminododecanoic N-chlorohydrate acid.

7. A combination according to claim 1, comprising benzylamine, acetic acid, and aminododecanoic N-p toluenesulphonate acid.

8. A combination according to claim 1, comprising nonylamine, acetic acid, and aminododecanoic N-p toluenesulphonate acid.

* * * * *